May 29, 1923.
B. W. MORTON
WHEELED TRACTOR
Original Filed Feb. 25, 1922
1,456,818
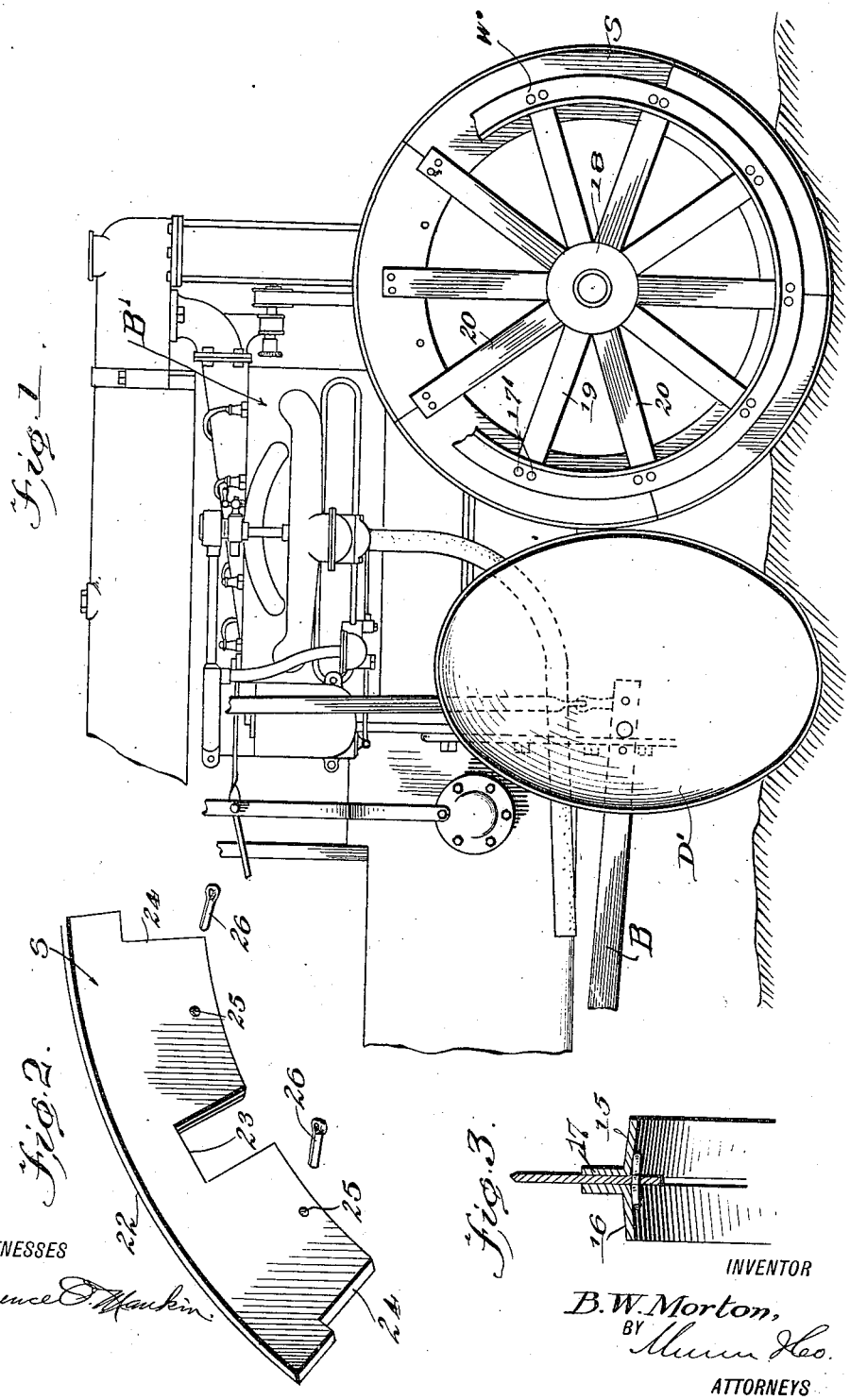
INVENTOR
B. W. Morton,
BY
ATTORNEYS Patented May 29, 1923.

1,456,818

UNITED STATES PATENT OFFICE.

BENJAMIN WHITFIELD MORTON, OF WILLISTON, FLORIDA.

WHEELED TRACTOR.

Original application filed February 25, 1922, Serial No. 539,251. Divided and this application filed September 29, 1922. Serial No. 591,381.

*To all whom it may concern:*

Be it known that I, BENJAMIN WHITFIELD MORTON, a citizen of the United States, and a resident of Williston, in the county of Levy and State of Florida, have invented certain new and useful Improvements in Wheeled Tractors, of which the following is a specification.

This invention relates to attachments for tractors.

The present application is a division of my pending application Serial No. 539,251, filed Feb. 25, 1922 and is directed to the particular cutter attachments disclosed in this pending application.

The object of the invention is to provide a cutter or colter attachment for wheeled tractors which may be attached to the wheels of a tractor and serve to cut the earth to facilitate the breaking or plowing thereof asd also serve to sever obstructions which may impede the progress of breaking or plowing the earth.

It is a further object of the invention that the cutter or colter attachment may be easily secured to the wheels of a tractor and at a low cost.

It is a still further object of the invention that the cutter attachment be durable and reliable in operation.

Other objects and advantages relating to details of construction, combination and arrangement of parts will hereinafter appear in the detailed description to follow.

The invention is illustrated by way of example in the accompanying drawings, in which:—

Figure 1 is a partial side elevation of a tractor illustrating the application of both the cutter and plowing attachments.

Figure 2 is an enlarged detail view of a section of the cutter and also showing pins for securing the same in position.

Figure 3 is a detail view further illustrating the manner in which the cutter sections are secured in position.

Similar reference numerals throughout the drawings refer to similar parts.

It may be here mentioned that the present invention is shown when associated with the so-called "Fordson" type of tractor for the purpose of identification.

Referring to the drawings more particularly B' indicates generally the body of a tractor and W' a front wheel thereof. At B there is indicated a push bar and at D' a disk plow which is adapted to be operated through said push bar B. This plow operates at the rear of the front wheel W'.

In a tractor of the type shown in Figure 1, the rim of a front wheel W' comprises two sections 15 and 16. These sections are each formed at their opposing edges with a flange 17, Figure 3. From the hub 18 of each wheel there extends two sets of spokes, namely 19 and 20; the spokes 19 occurring alternately and diverging from the spokes 20 as illustrated in Figure 1. The upper ends of these spokes are positioned between the flanges 17 of the rim sections 15 and 16 and secured by rivets 17', the rivets extending through the spokes and flanges. By this construction the flanges are spaced the thickness of the wheel spokes.

In carrying out the present invention relative to the colter or cutter, I provide a plurality of sections S, Figure 2. Each section being in the form of a plate arcuate in shape and having its outer periphery bevelled to form a cutting edge as at 22. Each section is also formed upon its inner edge with a recess 23 which is of the same width as either of the spokes 19 and 20 of the wheel W'. At each end of the cutter section S an offset 24 is provided which is one-half the width of the recess 23 and upon the two sections S being brought together to form a complete circle, the adjacent offsets 24 of the pair of sections will form a recess adapted to receive either of the spokes 19 or 20 of the wheel W'. Each section S is of substantially the same thickness as the two spokes 19 and 20. Also each section S is provided with a plurality of openings 25 adapted to receive a cotter pin 26 or like securing means.

In assembling or positioning a cutter upon a front wheel W', the sections S are positioned so that the inner peripheries thereof are between the flanges 17 of the wheel sections 15 and 16. The recesses 23 of the sections S will receive the outer ends of alternate wheel spokes while the recesses formed the offsets 24 of the sections S will receive the remainder of wheel spokes. By this construction the cutter sections are seated upon the outer ends of the wheel spokes. The cutter sections, as shown in Figure 1, are five in number, although this is merely arbitrary and any number of sections may be used. The cotter pins 26 are positioned in the openings 25 to hold the cutter sections in position.

The cutter sections are shown as applied to the front wheels of the tractor in that the construction of these wheels offer an easy application of the same, and also it is believed that cutters upon these wheels produce the best operative results.

In the operation of the present invention, as the tractor proceeds the disk D' is pushed forward and by using the cutters upon the front wheels any obstructions such as roots, or the like, which may be in the earth are cut and thus not impeding the operation of the disk plow D'. Also it should be here mentioned that by cutting the earth previous to plowing the same the breaking of the earth by the disk plow is greatly facilitated.

It is also important to be here noted that in the use of a tractor for plowing equipped with cutters of the present invention, that the steering of the tractor is made much easier. This is especially true when the tractor is used for breaking loose soil.

While I have shown my invention associated with a particular tractor and also with a particular type of plow, I wish it to be understood that I am aware of the fact that numerous advantages of the same may be obtained by employment with other types of tractors and with other types of plows; also that I am aware of the fact that slight changes may be made in the construction and application of the cutter sections without departing from the spirit of my invention as indicated by the appended claims.

I claim :—

1. In combination, a wheel having a circumferentially divided rim and spokes secured between the rim portions, a cutter blade section comprising a plate member having its outer edge bevelled to form a cutting edge, said plate member being adapted to be positioned between the rim portions of said wheel and having its inner edge formed with recesses adapted to receive the outer ends of the associated spokes of said wheel, whereby to hold the cutter blade section against inner movement or circumferential movement with respect to the wheel, and means for holding the cutter blade section against outer movement with respect to the wheel.

2. In combination, a wheel having a circumferentially divided rim and spokes secured between the rim portions, a cutter blade section comprising a plate member having its outer edge bevelled to form a cutting edge, said plate member being adapted to be positioned between the rim portions of said wheel and having its inner edge formed with recesses adapted to receive the outer ends of the associated spokes of said wheel, whereby to hold the cutter blade section against inner movement or circumferential movement with respect to the wheel, and removable means for holding the cutter blade section against outward movement with respect to the rim of the wheel.

3. In combination, a wheel having a circumferentially divided rim and spokes secured between the rim portions, a cutter blade section comprising a plate member having its outer edge bevelled to form a cutting edge, said plate member being adapted to be positioned between the rim portions of said wheel and having its inner edge formed with recesses adapted to receive the outer ends of the associated spokes of said wheel, whereby to hold the cutter blade section against inner movement or circumferential movement with respect to the wheel, and cotter pins extended through said cutter blade adjacent the inner edge thereof and adapted to abut the bottom sides of said rim sections and thereby to hold the cutter blade against outward movement with respect to the wheel rim.

4. In combination, a wheel having a circumferentially divided rim and each portion of the rim being formed upon its inner edge with an outwardly extending radial flange, and the spokes for said wheel being secured between said flanges whereby to bring the same in spaced relation, a cutter blade section comprising a plate-like member having its outer edge bevelled to form a cutting edge, said cutter blade section being adapted to be disposed between the flanges and having recesses formed upon its inner edge adapted to receive the outer ends of the associated spokes whereby the cutter blade section will be held against inner movement or circumferential movement with respect to the wheel rim, and removable means whereby to hold the cutter blade section against outward movement with respect to the wheel rim.

5. In combination, a wheel having a circumferentially divided rim and spokes secured between the rim portion, a plurality of cutter blade sections, each blade section comprising a plate member having its outer edge bevelled to form a cutting edge and arcuate longitudinally, said plate members or cutter blade sections being adapted to be positioned between the rim portions of said wheel and to extend entirely about said wheel and the ends of said plate members or cutter blade sections being offset whereby the sections may be interconnected, and each cutter blade section having its inner edge formed with recesses adapted to receive the outer ends of the associated spokes of said wheel whereby to hold the cutter blade sections against inner movement or circumferential movement with respect to the wheel, and means for holding the cutter blade sections against outer movement with respect to the wheel.

BENJAMIN WHITFIELD MORTON.